US008667835B2

(12) United States Patent
Doering et al.

(10) Patent No.: US 8,667,835 B2
(45) Date of Patent: Mar. 11, 2014

(54) METHOD AND SYSTEM FOR DIAGNOSING CYLINDER VALVE ACTIVATION/DEACTIVATION

(75) Inventors: Jeffrey Allen Doering, Canton, MI (US); John Eric Rollinger, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/620,036

(22) Filed: Sep. 14, 2012

(65) Prior Publication Data

US 2013/0013165 A1      Jan. 10, 2013

Related U.S. Application Data

(63) Continuation of application No. 12/352,989, filed on Jan. 13, 2009, now Pat. No. 8,286,471.

(51) Int. Cl.
*G01M 15/08* (2006.01)

(52) U.S. Cl.
USPC ..................................................... 73/114.79

(58) Field of Classification Search
USPC ............... 73/114.16, 114.31, 114.37, 114.77, 73/114.79
See application file for complete search history.

(56) References Cited

U.S. PATENT DOCUMENTS

| 4,549,514 | A | 10/1985 | Abe et al. |
| 5,557,971 | A | 9/1996 | Uemura et al. |
| 5,721,375 | A | 2/1998 | Bidner |
| 6,243,641 | B1 | 6/2001 | Andrews et al. |
| 6,382,175 | B1 | 5/2002 | van der Staay et al. |
| 6,499,470 | B2 | 12/2002 | Takagi et al. |
| 7,063,057 | B1 | 6/2006 | Waters et al. |
| 7,204,132 | B2 | 4/2007 | Reed et al. |
| 7,444,236 | B2 | 10/2008 | Wiles |
| 7,546,827 | B1 | 6/2009 | Wade et al. |
| 7,634,940 | B2 * | 12/2009 | Hartmann et al. ......... 73/114.37 |
| 7,762,237 | B2 | 7/2010 | Gibson et al. |
| 7,921,709 | B2 | 4/2011 | Doering et al. |
| 2006/0243030 | A1 | 11/2006 | Oe et al. |
| 2006/0243040 | A1 | 11/2006 | Reed et al. |
| 2008/0236267 | A1 * | 10/2008 | Hartmann et al. ......... 73/114.37 |
| 2009/0066337 | A1 | 3/2009 | Gibson et al. |
| 2010/0175463 | A1 | 7/2010 | Doering et al. |
| 2010/0288037 | A1 | 11/2010 | Gibson et al. |
| 2011/0016958 | A1 * | 1/2011 | Cinpinski et al. .......... 73/114.43 |
| 2011/0137509 | A1 * | 6/2011 | Sarac ............................... 701/29 |
| 2011/0167900 | A1 * | 7/2011 | Zanotti et al. .............. 73/114.37 |

FOREIGN PATENT DOCUMENTS

JP            403279626 A       12/1991

* cited by examiner

*Primary Examiner* — Eric S McCall
(74) *Attorney, Agent, or Firm* — Julia Voutyras; Alleman Hall McCoy Russell & Tuttle LLP

(57) ABSTRACT

Methods and systems are provided for monitoring cylinder valve deactivation in an engine operating with a plurality of cylinder valves. One example method comprises indicating valve degradation based on an indication of manifold pressure over a plurality of immediately successive induction events of the engine, the indication responsive to increases and decreases in the indication of manifold pressure correlated to the induction events of engine cylinders and further correlated to whether cylinders are commanded to be activated or deactivated.

20 Claims, 5 Drawing Sheets

METHOD AND SYSTEM FOR DIAGNOSING CYLINDER VALVE ACTIVATION/DEACTIVATION

CROSS REFERENCE TO RELATED APPLICATIONS

The present application is a continuation of U.S. patent application Ser. No. 12/352,989 filed Jan. 13, 2009, the entire contents of which are incorporated herein by reference for all purposes.

FIELD

The present application relates to methods for monitoring cylinder valve operation in a variable displacement engine (VDE).

BACKGROUND AND SUMMARY

Engines operating with a variable number of active or deactivated cylinders may be used to increase fuel economy, while optionally maintaining the overall exhaust mixture air-fuel ratio about stoichiometry. In some examples, half of an engine's cylinders may be disabled during selected conditions, where the selected conditions can be defined by parameters such as a speed/load window, as well as various other operating conditions including vehicle speed. A VDE control system may disable selected cylinders through the control of a plurality of cylinder valve deactivators that affect the operation of the cylinder's intake and exhaust valves.

Various approaches have been identified for diagnosing degradation in VDE operation, such as based on crankshaft vibrations related to engine firing order, firing frequency, etc. However, the inventors herein have recognized several disadvantages with such approaches. As an example, such approaches may be unable to identify particular situations, such as when one cylinder valve of a cylinder is properly deactivated, but another valve in the same cylinder continues to operate even when it is commanded to be deactivated. As another example, such approaches may be unable to identify situations where one cylinder valve of a cylinder is properly activated, but another valve in the same cylinder fails to operate even when it is commanded to be activated. As yet another example, such approaches may be unable to identify situations where both valves in a single cylinder continue to operate even when they are commanded to be deactivated.

Thus, in one example, the above issues may be at least partially addressed by a method of monitoring cylinder valve deactivation in an engine operating with a plurality of cylinder valves, the method comprising, indicating valve degradation based on an indication of manifold pressure over a plurality of immediately successive induction events of the engine, said indication responsive to increases and decreases in the indication of manifold pressure correlated to the induction events of engine cylinders, and further correlated to whether cylinders are commanded to be activated or deactivated.

In one example situation, a cylinder is commanded to be activated, and while an exhaust valve of the cylinder is properly activated, an intake valve does not lift during the intake stroke. Herein, no induction event occurs even though an induction event was expected for the cylinder's intake stroke. As such, the non-operation of the intake valve will cause substantially no intake air to be drawn into the cylinder and compressed. As a result, the change in manifold pressure associated with that intake stroke of that cylinder may be significantly different (for example, significantly higher) from the expected change in manifold pressure. The expected change in manifold pressure for a given cylinder's intake stroke may be determined statistically based on corresponding changes in manifold pressure (during corresponding intake strokes) for cylinders that fire before and/or after the monitored cylinder, in the engine cycle.

In another example situation, a cylinder is commanded to be deactivated, and both an exhaust valve and an intake valve continue to lift during the intake stroke. Herein, an induction event occurs even though no induction event was expected for the cylinder's intake stroke. As such, the operation of the intake and exhaust valves will cause a substantial amount of intake air to be drawn into the cylinder and compressed. As a result, the change in manifold pressure associated with that intake stroke of that cylinder may be significantly different (for example, significantly lower) from the expected change in manifold pressure.

By monitoring the manifold pressure response during the intake stroke of each cylinder, and by comparing an average change in manifold pressure during a first sampling window (for example, the first 90 crank degrees) and a second sampling window (for example, the last 90 crank degrees) of an intake stroke, valve activation/deactivation degradation may be identified. Specifically, if the change in manifold pressure for the monitored cylinder is significantly different from a statistically determined change in manifold pressure during an intake stroke for all the other cylinders, the nature of valve degradation may be further identified. In this way, by comparing a change in manifold pressure associated with each intake stroke of a cylinder with a statistically determined expected pressure change based on the response of other cylinders, and further based on the expected presence or absence of an induction event, valve degradation associated with VDE operations can be identified and distinguished.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4B:
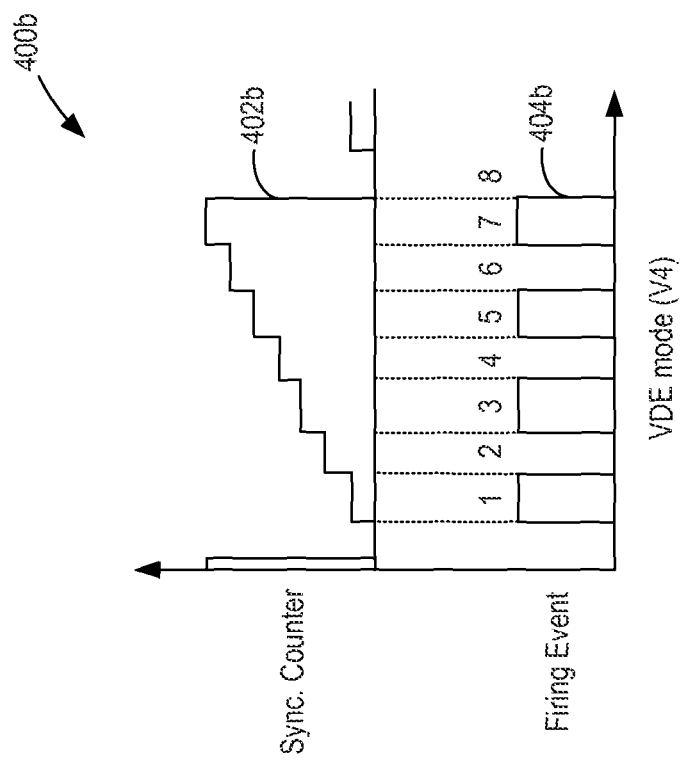
FIGS. 4A-B shows a map of immediately successive firing events (or induction events) during engine operation in VDE and non-VDE modes.
Figure 4A:
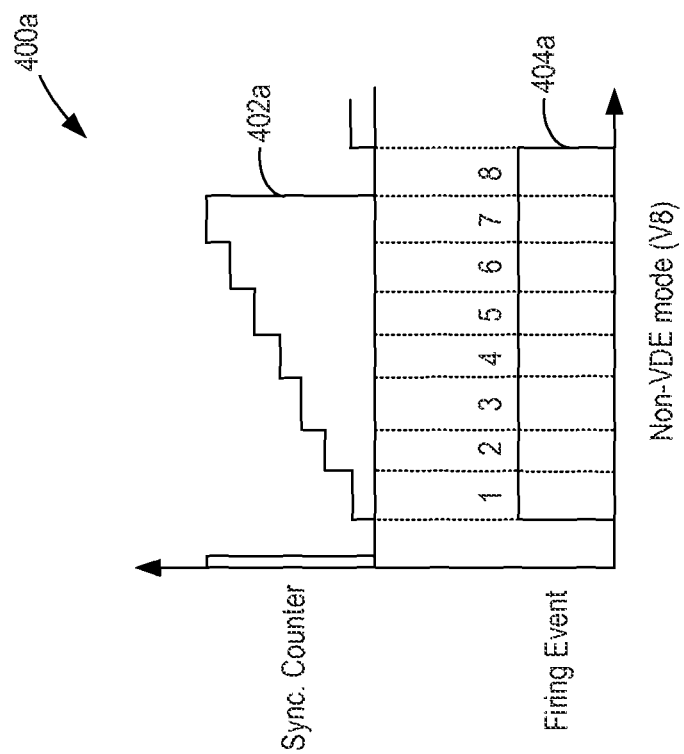
Figure 5:
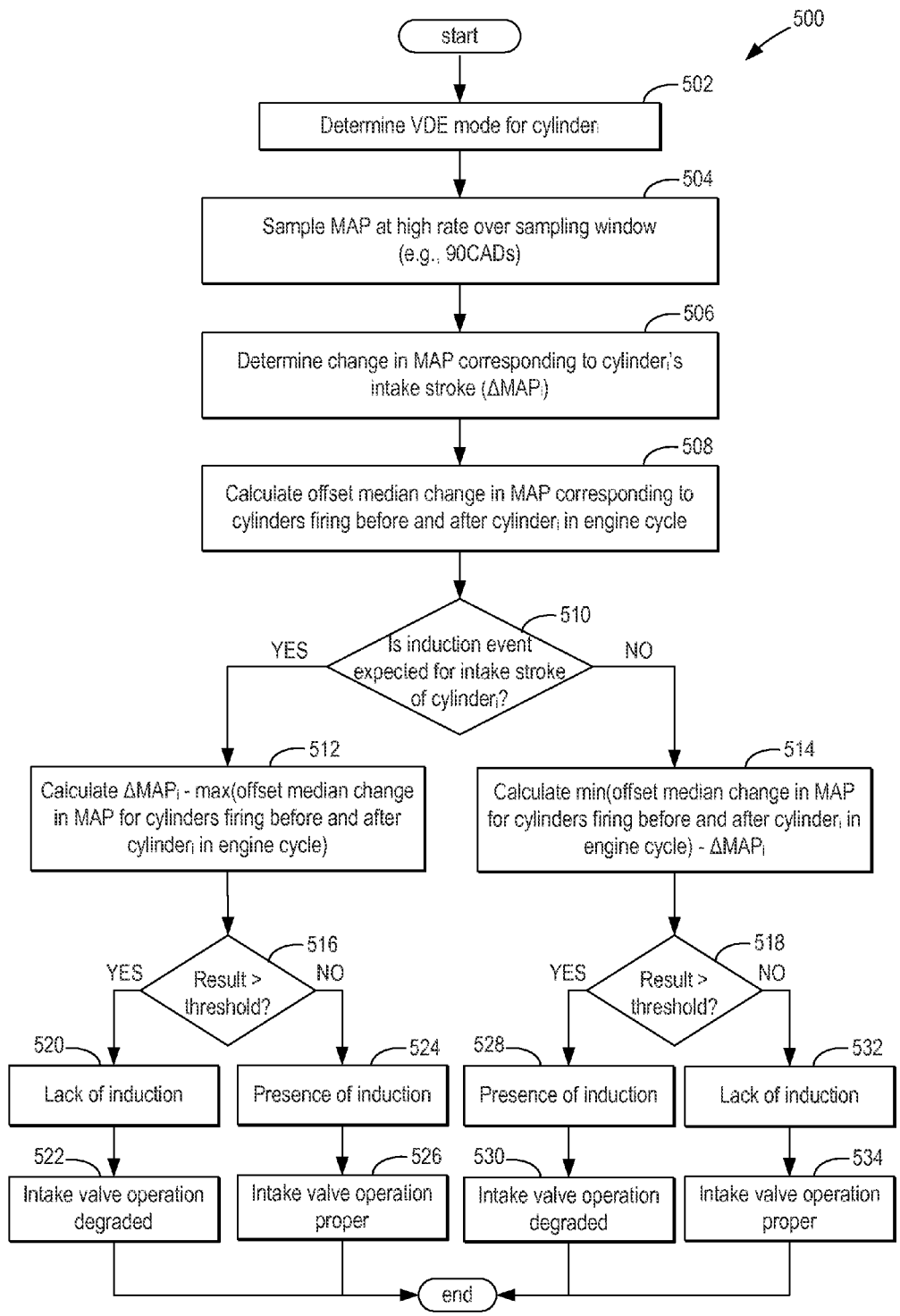
FIG. 5 shows a high level flow chart for a MAP signal-based VDE diagnostics routine.

The following description relates to systems and methods for monitoring valve operation in cylinders of an engine operating with variable displacement. As such, the variable displacement engine (VDE), such as the engine depicted in FIGS. 1-2, can switch between operation with all cylinders firing or half the cylinders firing by changing the operation of the intake and exhaust valves of selected cylinders. An engine control system uses manifold pressure comparisons, such as those depicted in FIG. 3, to distinguish between the presence or absence of an induction event during the intake stroke of each cylinder. The change in MAP associated with each induction event of a given cylinder is compared to a statistically relevant change in MAP associated with each induction event of cylinders immediately preceding and/or immediately succeeding the given cylinder (FIGS. 4A-B). Based on the computed difference, and further based on whether an induction event was expected or not for that intake stroke, intake valve degradation (of the given cylinder) may be identified. As such, the control system may be configured to execute such a VDE diagnostic routine, such as depicted in FIG. 5, once per engine intake stroke. In this way, the diagnostics routine of the present disclosure can accurately identify VDE transition issues with reduced reliance on band-pass filtering, and also while using significantly lower levels of sampling as compared to other frequency-based diagnostic routines. However, high frequency sampling and band pass filtering may be used, if desired. Furthermore, degraded VDE operation may be identified in the presence of other frequency based diagnostic routines, such as in the presence of misfires.

Figure 1:
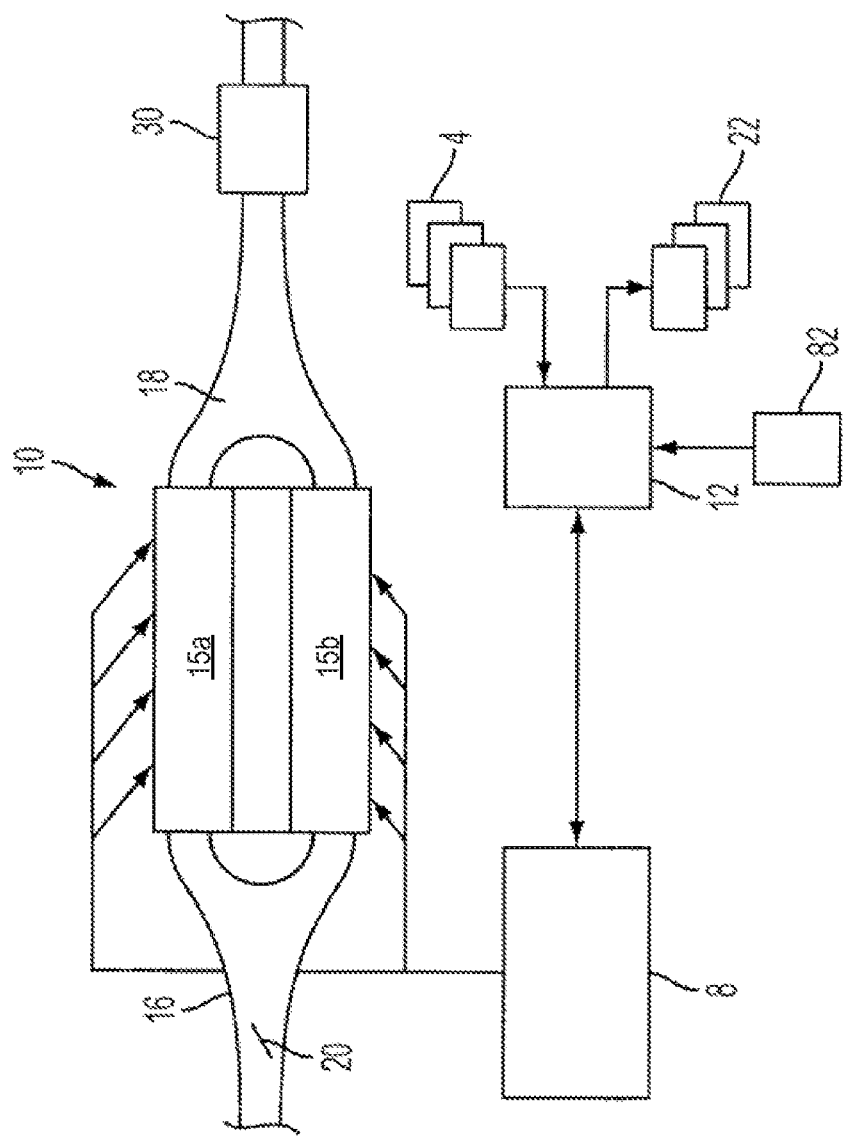
FIG. 1 shows an example engine and exhaust system layout.

FIG. 1 shows an example variable displacement engine (VDE) 10, in which four cylinders (e.g., two in each bank) may have cylinder valves held closed during one or more engine cycles. The cylinder valves may be deactivated via hydraulically actuated lifters, or via a cam profile switching (CPS) mechanism in which a cam lobe with no lift is used for deactivated valves. As depicted herein, engine 10 is a V8 engine with two cylinder banks 15a and 15b having an intake manifold 16 (with throttle 20) and an exhaust manifold 18 coupled to an emission control system 30 including one or more catalysts and air-fuel ratio sensors.

Engine 10 may operate on a plurality of substances, which may be delivered via fuel system 8. Engine 10 may be controlled at least partially by a control system including controller 12. Controller 12 may receive various signals from sensors 4 coupled to engine 10, and send control signals to various actuators 22 coupled to the engine and/or vehicle. Further, controller 12 may receive an indication of knock from knock sensor 82.

Figure 2:
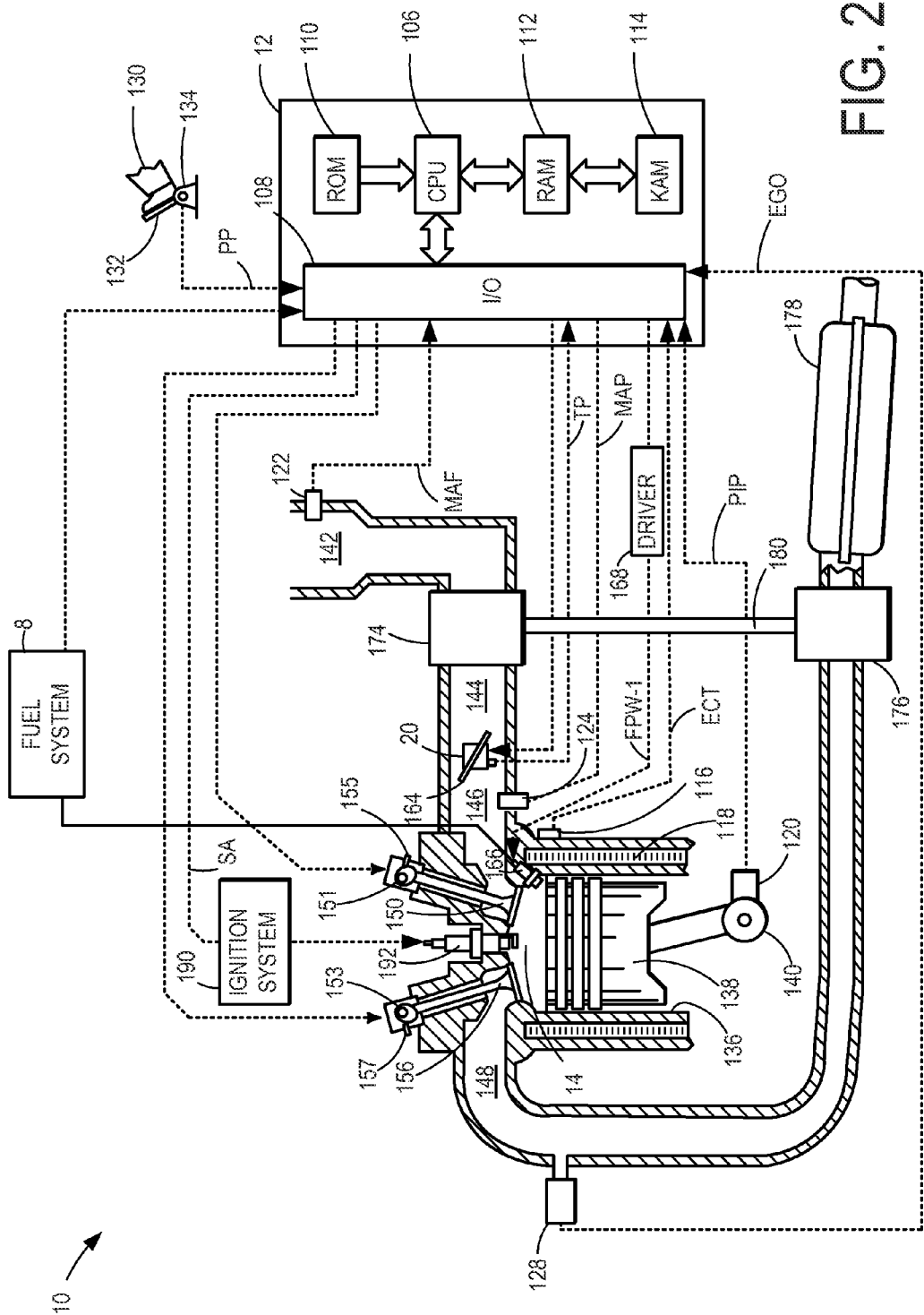
FIG. 2 shows a partial engine view.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder. The valves of deactivatable cylinder 14 may be deactivated via hydraulically actuated lifters coupled to valve pushrods, or via a cam profile switching mechanism in which a cam lobe with no lift is used for deactivated valves. In this example, deactivation of intake valve 150 and exhaust valve 156 may be controlled by cam actuation via respective cam actuation systems 151 and 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems.

As depicted herein, in one embodiment, deactivation of intake valve 150 may be controlled by cam-based VDE actuator 151 while deactivation of exhaust valve 156 may be controlled by cam-based VDE actuator 153. In alternate embodiments, a single VDE actuator may control deactivation of both intake and exhaust valves of the deactivatable cylinder. In still other embodiments, a single cylinder valve actuator deactivates a plurality of cylinders (both intake and exhaust valves), for example all the cylinders in the deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

Controller 12 is shown in FIG. 2 as a microcomputer, including microprocessor unit 106, input/output ports 108, an electronic storage medium for executable programs and calibration values shown as read only memory (ROM) chip 110 in this particular example, random access memory (RAM) 112, keep alive memory (KAM) 114, and a data bus. Storage medium read-only memory 110 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold air pressure signal (MAP) from sensor 124. Engine speed signal, RPM, may be generated by controller 12 from signal PIP. Further, crankshaft position, as well as crankshaft acceleration, and crankshaft oscillations may also be identified based on the signal PIP. Manifold air pressure signal MAP from manifold pressure sensor 124 may be used to provide an indication of vacuum, or pressure, in the intake manifold. Further, manifold pressure may be estimated based on other operating parameters, such as based on MAF and RPM, for example.

Figure 3:
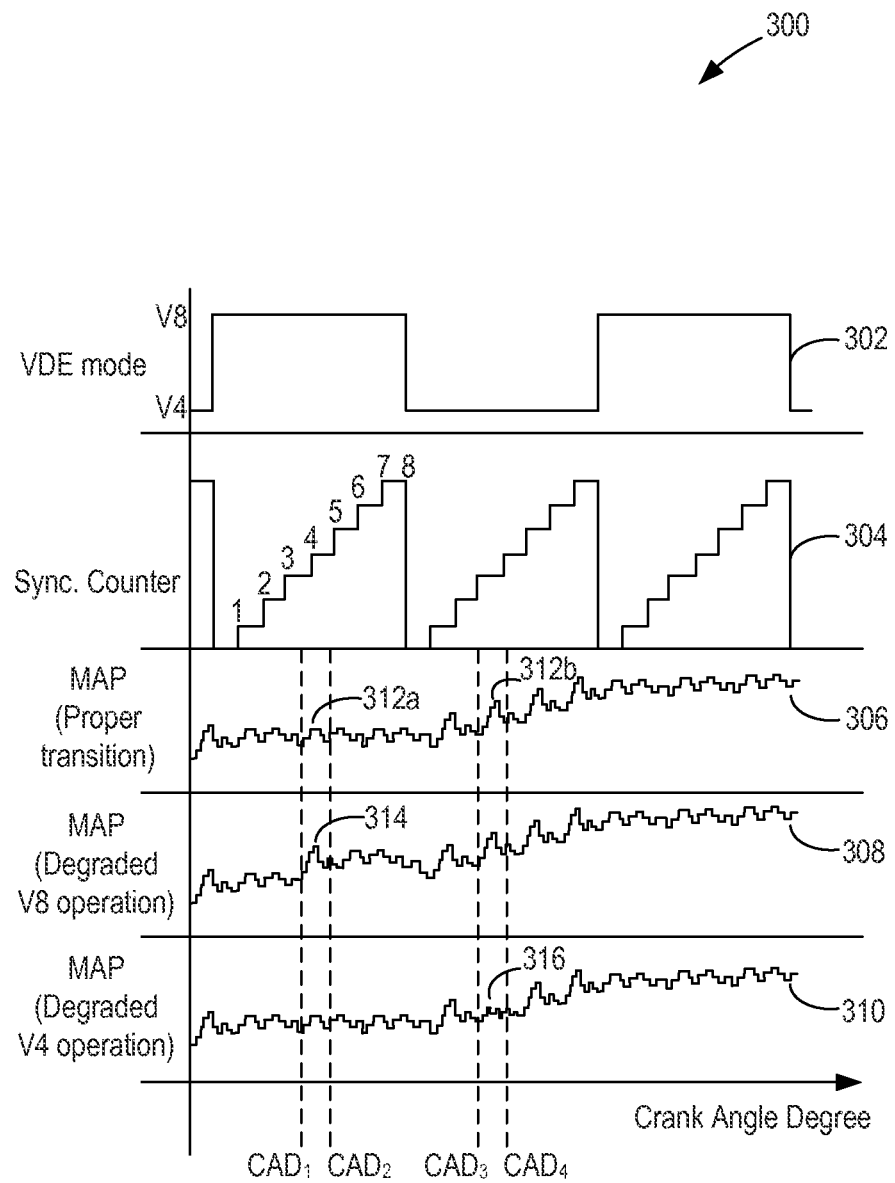
FIG. 3 shows a map of variation in manifold absolute pressure (MAP) signals for each cylinder during engine operation in VDE and non-VDE modes.

As further elaborated in FIG. 3, controller 12 may monitor signals and/or information indicative of manifold pressure (such as signal MAP) over successive cylinder events, in particular over successive intake strokes. The change in manifold pressure associated with the intake stroke of each cylinder may then be compared to statistically relevant changes in manifold pressure associated with the intake stroke of cylinders immediately preceding and/or following the monitored cylinder. In one example, an offset median of change in MAP for each of the immediately preceding and/or succeeding cylinders may be used to compute a MAP variation for the monitored cylinder. Based on the magnitude of variation in MAP, and further based on the expectation of an induction event on each monitored intake stroke, controller 12 may distinguish properly functioning and degraded VDE valve operations.

FIG. 3 illustrates map 300 depicting variations in a measured or estimated MAP signal over successive (firing or non-firing) cylinder events during a VDE transition. Specifically, variations in a MAP signal over successive intake strokes (or induction events) are measured or estimated. As such, the cylinders may alternate between a VDE (or V4) mode of operation and a non-VDE (or V8) mode of operation, as indicated in graph 302. The successive firing and/or non-firing events (or induction events), as depicted by the steps of the synchronization counter in graph 304, are indicative of successive firing and/or non-firing cylinders. The successive events may be numbered 1-8, as depicted. It will however be appreciated that the numbering is only indicative of the succession of events (that is, a first firing/non-firing cylinder, then a second firing/non-firing cylinder, and so on) and not indicative of the actual firing order of the cylinders (that is, not cylinder 1 followed by cylinder 2, and so on). Thus, when shifting from a V4 to a V8 mode (exit from VDE), previously deactivated cylinders may be activated and all 8 cylinders may fire. In contrast, when shifting from a V8 to a V4 mode (entry into VDE), selected cylinders may be deactivated. In one example, the first four cylinders in the firing order may be deactivated, while the next 4 cylinders in the firing order may fire. A map illustrating the succession of cylinder events in the VDE and non-VDE modes is elaborated below with reference to FIGS. 4A-B.

Returning to FIG. 3, graph 306 represents an example of characteristic MAP variations during a properly functioning VDE transition. Distinct MAP variation patterns may be observable during regular V4 and V8 operation. Specifically, during a V8 operation, substantially no MAP variation may be noticeable between intake strokes due to induction events taking place. In contrast, during a V4 operation, an increase in MAP may be observed between intake strokes due to the absence of induction events taking place. The manifold air pressure may be sampled in each of a plurality of sampling windows. In one example, as depicted herein, the sampling windows may be crank angle sampling windows. The variations in MAP signal may then be plotted against the sampling window, defined herein by a specific number of crank angle degrees (CAD). In one example, MAP variation during the first 90 crank angle degrees of an intake stroke may be compared to the last 90 degrees of an intake stroke. As such, based on the sampling window where an abnormal MAP variation may be identified, and/or further based on the firing order of the cylinders, the controller may determine the identity of the responsible cylinder and the degraded intake valve.

Graph 308 represents an example of MAP variation during a degraded V8 operation. Upon comparison of graphs 306 and 308, specifically upon comparing segments 312a and 314, an abnormal MAP variation may be determined during an intake stroke between times $CAD_1$ and $CAD_2$. Unlike the substantially no change in MAP that is seen during normal V8 operation (see segment 312a of graph 306), during an abnormal V8 operation, a sudden increase in MAP may be observed at segment 314 of graph 308. As such, given that the engine is in a V8 mode of operation, that is, all cylinders are activated, an induction event is expected in that sampling window, and consequently no increase in manifold pressure may be expected. A controller may be configured to calculate a change in the average MAP during sampling window $CAD_1$ to $CAD_2$ (for example, by comparing an average MAP during a first 90 crank angle degrees of the intake stroke with that in the last 90 crank degrees of the intake stroke). The controller may be further configured to compare the average change in MAP for the monitored cylinder with a statistically determined (for example, median, mean, or offset median) change in MAP for the intake stroke of a plurality of immediately successive induction events of the engine, including at least a preceding and a succeeding set of cylinders (or for example, all the other firing cylinders), and accordingly determine whether an intake valve degradation has occurred or not. In this example, it may be determined that the change in map in segment 314 is greater than statistically expected. Given that an induction event was expected for that segment, a controller may conclude that an intake valve did not lift when it was commanded to do so, resulting in an increase in air in the intake manifold and a consequent increase in manifold pressure. That is, the controller may conclude an intake valve degradation based V8 mode of operation error.

Graph 310 represents an example of MAP variation during a degraded V4 mode of operation. Upon comparison of graphs 306 and 310, specifically upon comparing segments 312b and 316, an abnormal MAP variation may be determined during an intake stroke between times $CAD_3$ and $CAD_4$. Unlike the substantial increase in MAP between intake strokes that is seen during normal V4 operation (see segment 312a of graph 306), during an abnormal V4 operation, no substantial increase in MAP may be observed at segment 316 of graph 310. As such, given that the engine is in a V4 mode of operation, that is, some cylinders are deactivated, an induction event is not expected in that sampling window, and consequently an increase in manifold pressure may be expected. A controller may be configured to calculate a change in the average MAP during a crank angle sampling window $CAD_3$ to $CAD_4$ (for example, by comparing an average MAP during a first 90 crank angle degrees of the intake stroke with that in the last 90 crank angle degrees of the intake stroke). The controller may be further configured to compare the average change in MAP with a statistically relevant (for example, median, mean, or offset median) change in MAP for the intake stroke of at least a preceding and succeeding set of cylinders (or for example, all the other cylinders), and accordingly determine whether an intake valve degradation has occurred or not. In this example, it may be determined that the change in map in segment 316 is greater than statistically expected. Given that an induction event was not expected for that segment, a controller may conclude that an intake valve did lift when it was commanded to not do so, resulting in an induction event and a consequent decrease in manifold pressure. That is, the controller may conclude an intake valve degradation based V4 mode of operation error.

As such, the sampling window may be selected such that there may be little to no signal overlap for the intake valves of differing cylinders. Additionally, for valves operating with VCT, the sampling window may be appropriately adjusted (for e.g., broadened or retarded) when operating with cam retard or advance, and vice versa. That is, the sampling window may be adjusted responsive to adjustments in cam timing. In this way, the diagnostics routine may be extended to engines operating valves with cam timing adjustments.

It will be appreciated that while the depicted example shows a method for identifying valve degradation in a single cylinder, the same may be extended to a group of cylinders. In one example, each cylinder and/or each valve in each cylinder, may have independent deactivation mechanisms and thus may be diagnosed independently. In another example, a group of cylinders or a group of valves (on a plurality of cylinders) may share a common deactivation mechanism and thus may be diagnosed as a group. As such, based on the deactivation configuration, the VDE diagnostics routine may accordingly diagnose and identify a single cylinder and/or valve or a group of cylinders and/or valves during abnormal MAP responses.

FIGS. 4A-B illustrates maps 400a and 400b depicting the presence or absence of a firing event (or induction event) over successive cylinder events during engine operation in non-VDE and VDE modes, respectively. Using such a map, successive cylinder events may be identified for use in a VDE cylinder valve degradation diagnostics routine of the present disclosure.

In FIG. 4A, graph 402a of map 400a depicts the output of a synchronization counter of an example 8-cylinder engine operating in non-VDE mode. The synchronization counter counts the totality of successive firing and non-firing events of the engine. Thus, as depicted by the eight steps of the synchronization counter, eight successive cylinder events may be identified. It will be appreciated that since the engine is in a non-VDE mode and all cylinders are activated, all eight successive events may be firing events, as denoted by graph 404a. It will be appreciated that the numbering herein (1-8) represents the succession of firing events and not the order of successively firing cylinders. Thus, when selecting a plurality of immediately successive induction events of the engine for diagnostic purposes, the control system may be configured to provide an indication of manifold pressure for a monitored cylinder and for firing cylinders immediately preceding (for example, at least one firing cylinder immediately preceding) the monitored cylinder and for firing cylinders immediately succeeding (for example, at least one firing cylinder immediately succeeding) the monitored cylinder. As one example, if the cylinder corresponding to firing event 4 was the monitored cylinder, the diagnostics routine may provide an indication of manifold pressure for cylinders corresponding at least to firing events 3 and 5, in addition to firing event 4. In another example, the diagnostics routine may provide an indication of manifold pressure for cylinders corresponding at least to firing events 2, 3, 5 and 6 in addition to firing event 4, that is, an equal number of cylinders immediately preceding and succeeding the monitored cylinder. In still another example, an unequal number may be selected, for example cylinders corresponding to firing events 2, 3, 4, and 5 or 3, 4, 5, and 6, and so on.

In FIG. 4B, graph 402b of map 400b depicts the output of a synchronization counter of an example 8-cylinder engine operating in a VDE mode. Thus, as depicted by the eight steps of the synchronization counter, eight successive cylinder events may be identified. However, since the engine is in a VDE mode and some cylinders (for example herein, half the number of cylinders) are activated, all eight successive events may not be firing events, as denoted by graph 404b. It will be appreciated that the numbering herein (1-8) represents the succession of events and not the order of successively firing cylinders. Thus, when selecting a plurality of immediately successive induction events for diagnostics purposes, the control system may be configured to provide an indication of manifold pressure for the monitored cylinder and at least one firing cylinder immediately preceding the monitored cylinder and at least one firing cylinder immediately succeeding the monitored cylinder. As one example, if the cylinder corresponding to firing event 5 was the monitored cylinder, the diagnostics routine may provide an indication of manifold pressure for cylinders corresponding at least to firing events 3 and 7 in addition to firing event 5. As previously elaborated with reference to FIG. 4A, an equal or an unequal number of firing events immediately preceding and succeeding the monitored cylinder may be selected, for example cylinders corresponding to firing events 1, 3, 5, and 7, and so on.

Now turning to FIG. 5, an example VDE diagnostics routine 500 is described for identifying degraded intake valve operation responsive to statistically relevant variations in MAP signals over individual intake strokes. At 502, the VDE mode of operation may be determined. For example, when operating with an 8-cylinder engine, it may be determined whether the engine is operating in V4 mode (or entry into VDE mode) or in V8 mode (or exit from VDE mode). At 504, an intake MAP may be sampled at a high rate (for example at 1-2 kHz) over a sampling window between intake valve opening events for the cylinders that can be deactivated. As one example, the sampling window may be a crank angle sampling window, defined by a number of crank angle degrees (CAD). Further, the manifold pressure may be sampled in each of a plurality of crank angle sampling windows. At 506, an average change in map corresponding to a monitored cylinder's (cylinder) intake stroke may be calculated (AMAP). In one example, the average change may be determined by comparing the average MAP during the first 90 crank angle degrees of the intake stroke of the monitored cylinder with the average MAP during the last 90 crank angle degrees of the intake stroke of that cylinder.

At 508, a representative indication of change in MAP over a plurality of immediately successive cylinder induction events of the engine may be determined for comparison with the change in MAP of the monitored cylinder calculated at 506. Specifically, the indication may include a statistically determined change in MAP for a plurality of immediately successive induction events corresponding to a given set of cylinders. The given set may at least include a cylinder firing before and a cylinder firing after the monitored cylinder in the engine cycle. In one example, as depicted at 508, the statistically determined change in MAP may be an offset median change in manifold pressure for the plurality of immediately successive induction events selected. In alternate embodiments, a median, mean, or other statistical parameter may be used. As such, this value may correspond to the representative change in MAP as may be expected for a given set of cylinder events. It will be appreciated that the changes in manifold pressure used for diagnosing degradation may all be buffered with a time history. It will also be appreciated that the change in MAP for the monitored cylinder and the successive induction events may be further adjusted based on the expected inducted aircharge or load for each induction event. In one example, this may be achieved by dividing the change in MAP by the aircharge or load. In another example, this may be achieved by dividing the change in MAP by the maximum aircharge or load and a scalar value.

At 510, it may be determined whether an induction event was expected or not for the intake stroke of the given cylinder (cylinder). In one example, if a cylinder is activated, an induction event may be expected. In another example, if a cylinder is deactivated, an induction event may not be expected. If an induction event was expected, then at 512, a difference in MAP variation may be calculated as follows:

Difference=$\Delta MAP_i$−max(offset median change in MAP for cylinders firing before and after cylinder$_i$)

That is, a difference between a change in manifold pressure for the monitored cylinder and a maximum of the offset median change in manifold pressure for the plurality of immediately successive induction events (that is, the offset median change in MAP for the plurality of immediately succeeding and the plurality of immediately preceding induction events) may be calculated. As such, the chosen set of comparison cylinders may include at least one cylinder firing before and one after the given cylinder, in the engine cycle. If the resulting difference is greater than a predetermined threshold value at 516, then at 520, a lack of induction may be concluded. Since an induction event was expected for this cylinder (as determined at 510), a lack of induction at 520 may indicate intake valve degradation at 522. Specifically, an intake valve of the cylinder may not have lifted when it was commanded to do so. Accordingly, a diagnostic code may be set by the controller to indicate valve degradation. In contrast, if the resulting difference at 516 is not greater than the predetermined threshold value, then at 524, a presence of induction may be concluded. Since an induction event was expected for this cylinder, a presence of induction at 520 may indicate no intake valve degradation at 526.

If no induction event was expected for the intake stroke of cylinder, at 510, then at 514, a difference in MAP variation may be calculated as follows:

Difference=min(offset median change in MAP for cylinders firing before and after cylinder$_i$)− $\Delta MAP_i$ That is, a difference between a minimum of the offset median change in manifold pressure for the plurality of immediately successive induction events (that is, the offset median change in MAP for the plurality of immediately succeeding and the plurality of immediately preceding induction events) and a change in manifold pressure for the monitored cylinder may be calculated. If the resulting difference is greater than a predetermined threshold value at 518, then at 528, a presence of induction may be concluded. Since no induction event was expected for this cylinder (as determined at 510), a presence of induction at 528 may indicate intake valve degradation at 530. Specifically, an intake valve of the cylinder may have lifted when it was not commanded to do so. Accordingly, a diagnostic code may be set by the controller to indicate valve degradation. In contrast, if the resulting difference at 518 is not greater than the predetermined threshold value, then at 532, a lack of induction may be concluded. Since an induction event was not expected for this cylinder, a lack of induction at 532 may indicate no valve degradation at 534. In this way, valve degradation may be indicated based on an indication of manifold pressure over a plurality of immediately successive induction events of the engine, the indication responsive to increases and decreases in the indication of manifold pressure correlated to the induction events of engine cylinders, and further correlated to whether cylinders were commanded to be activated or deactivated.

It will be appreciated that while the depicted example shows a routine for identifying the presence or absence of improper lift in an intake valve during VDE operation based on variations in MAP, the same may be used to indicate that the lash on the engine batch was not properly adjusted and that the VDE cylinder intake valves did not lift as much as was expected, or as much as the non-VDE cylinder intake valves lifted.

In this way, by comparing variations in MAP for a given cylinder's intake stroke with that for cylinders immediately surrounding the given cylinder, intake valve degradation leading to improper VDE operation may be identified when cylinders induct when not commanded or do not induct when commanded. By not necessitating fast sampling levels and/or signal bandpass filtering, the method may be used in conjunction with other frequency-based diagnostic routines, such as misfire detection routines.

Note that the example process flows included herein can be used with various valve system, engine system, and/or vehicle system configurations. These process flows may represent one or more of any number of processing strategies such as event-driven, interrupt-driven, multi-tasking, multi-threading, and the like that may be performed by the control system. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or operations may be repeatedly performed depending on the particular strategy being used. Further, the described acts may graphically represent code to be programmed into a computer readable storage medium of the control system.

It will be appreciated that the configurations and process flows disclosed herein are exemplary in nature, and that these specific embodiments are not to be considered in a limiting sense, because numerous variations are possible.

The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine cylinder with a deactivatable intake and exhaust valve, comprising:
   commanding the intake and exhaust valves to be activated; and
   determining that the exhaust valve of the cylinder is properly activated and while it is properly activated:
   indicating that the intake valve does not lift during an intake stroke based on a change in manifold pressure associated with the intake stroke of the cylinder being higher than an expected change in manifold pressure, the expected change in manifold pressure statistically based on corresponding changes in manifold pressure, during corresponding intake strokes, for cylinders that fire before and after the cylinder, in an engine cycle.

2. The method of claim 1, wherein the expected change in manifold pressure statistically based on corresponding changes in manifold pressure includes comparing a change in manifold pressure of the cylinder during each of a first sampling window and a second, different sampling window of the intake stroke with an average change in manifold pressure for the cylinders that fire before and after the cylinder in the engine cycle, during each of the first and second sampling windows.

3. The method of claim 2, wherein the first and second sampling windows are crank angle sampling windows.

4. The method of claim 3, wherein the first sampling window includes a first 90 crank degrees of the intake stroke and wherein the second sampling window includes a last 90 crank degrees of the intake stroke.

5. The method of claim 4, wherein the intake and exhaust valves are operated with variable cam timing and wherein one or more of the first and second sampling windows is adjusted responsive to adjustments in cam timing.

6. The method of claim 1, wherein the indicating is further based on an expected presence or absence of an induction event.

7. The method of claim 6, wherein commanding the intake and exhaust valves to be activated includes expecting the presence of the induction event.

8. The method of claim 1, wherein indicating that the intake valve did not lift includes setting a diagnostic code.

9. The method of claim 1, wherein the expected change in manifold pressure statistically based on corresponding changes in manifold pressure, during corresponding intake strokes, for cylinders that fire before and after the cylinder, in the engine cycle includes an equal number of cylinders immediately preceding and succeeding the cylinder.

10. The method of claim 1, wherein the expected change in manifold pressure statistically based on corresponding changes in manifold pressure, during corresponding intake strokes, for cylinders that fire before and after the cylinder, in the engine cycle includes an unequal number of cylinders immediately preceding and succeeding the cylinder.

11. A method for an engine with cylinder valve deactivators, comprising:
    commanding a cylinder intake valve and exhaust valve to be activated;
    indicating that the exhaust valve is properly activated;
    while expecting an induction event and responsive to the indicated properly activated exhaust valve, estimating a change in manifold pressure for the cylinder during an intake stroke; and
    in response to the estimated change in manifold pressure being higher than an expected change, indicating intake valve degradation, the expected change based on a statistically determined change in manifold pressure for a plurality of cylinders firing before and after the cylinder in an engine cycle.

12. The method of claim 11, wherein indicating intake valve degradation includes indicating that the intake valve of the cylinder did not lift when commanded to be activated.

13. The method of claim 11, wherein estimating the change in manifold pressure for the cylinder during the intake stroke includes estimating an average change in manifold pressure for the cylinder, the manifold pressure sampled during one or more crank angle sampling windows of the cylinder's intake stroke.

14. The method of claim 13, wherein cylinders firing before and after the cylinder in the engine cycle includes an equal number of cylinders firing before and after the cylinder in the engine cycle.

15. The method of claim 11, wherein cylinders firing before and after the cylinder in the engine cycle includes an unequal number of cylinders firing before and after the cylinder in the engine cycle.

16. The method of claim 13, wherein the statistically determined change in manifold pressure includes a maximum of an offset median change in manifold pressure for the plurality of cylinders firing before and after the cylinder in the engine cycle.

17. The method of claim 11, wherein the estimated change in manifold pressure for the cylinder is adjusted based on an expected inducted aircharge for the induction event, and wherein the statistically determined change in manifold pressure for the plurality of cylinders is also adjusted based on an expected inducted aircharge for each of the plurality of cylinders for each induction event.

18. A method for an engine with cylinder valve deactivators, comprising:
commanding a cylinder intake valve and exhaust valve to be activated;
while indicating that the exhaust valve of the cylinder is properly activated;
sampling a change in manifold pressure of the cylinder during each of a first and second sampling window of an intake stroke of the cylinder;
estimating an average change in manifold pressure for the cylinder based on the sampled change in each of the first and second sampling windows; and
in response to the estimated change being higher than an expected change, indicating intake valve degradation, the expected change based on a statistically determined change in manifold pressure for a plurality of cylinders firing before and after the cylinder in an engine cycle.

19. The method of claim 18, wherein the statistically determined change in manifold pressure includes one of a mean, median, and offset median change in manifold pressure.

20. The method of claim 18, wherein commanding the cylinder intake valve to be activated includes expecting an induction event, and wherein indicating intake valve degradation includes indicating that the intake valve did not lift during the expected induction event.

* * * * *